(12) United States Patent
Olgun

(10) Patent No.: US 11,949,443 B2
(45) Date of Patent: *Apr. 2, 2024

(54) ADAPTIVE EYEWEAR ANTENNA

(71) Applicant: Snap Inc., Santa Monica, CA (US)

(72) Inventor: Ugur Olgun, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,478

(22) Filed: Oct. 19, 2022

(65) Prior Publication Data
US 2023/0039467 A1 Feb. 9, 2023

Related U.S. Application Data

(63) Continuation of application No. 17/187,849, filed on Feb. 28, 2021, now Pat. No. 11,509,343, which is a continuation of application No. 16/684,796, filed on Nov. 15, 2019, now Pat. No. 10,938,432.

(60) Provisional application No. 62/781,309, filed on Dec. 18, 2018.

(51) Int. Cl.
*H04B 1/3827* (2015.01)
*H01Q 1/27* (2006.01)
*H01Q 1/40* (2006.01)
*H01Q 7/00* (2006.01)
(Continued)

(52) U.S. Cl.
CPC ............. *H04B 1/385* (2013.01); *H01Q 1/273* (2013.01); *H01Q 1/40* (2013.01); *H01Q 7/00* (2013.01); *H01Q 9/30* (2013.01); *H04B 17/21* (2015.01); *H04B 2001/3866* (2013.01)

(58) Field of Classification Search
CPC ................... H04B 1/385; H04B 17/21; H04B 2001/3866; H04B 1/0343; H04B 1/0458; H04B 1/18; H04B 1/40; H04B 17/11; H01Q 1/273; H01Q 1/40; H01Q 7/00; H01Q 9/30; G02C 11/10
See application file for complete search history.

(56) References Cited

U.S. PATENT DOCUMENTS 10,044,380 B1  8/2018 Broyde et al.
10,158,174 B2  12/2018 O'Driscoll
10,938,432 B2  3/2021 Olgun
(Continued)

FOREIGN PATENT DOCUMENTS

CN 106462793 A 2/2017

OTHER PUBLICATIONS

International Search Report and Written Opinion for International Application No. PCT/US2019/061619, dated Feb. 17, 2020 (Feb. 17, 2020)—13 pages.

*Primary Examiner* — Andrew Wendell
(74) *Attorney, Agent, or Firm* — Culhane Meadows PLLC; Stephen J. Weed

(57) ABSTRACT

An eyewear device that includes a lens; a support structure adapted to be worn on the head of a user, the support structure including a rim configured to support the lens in a viewing area visible to the user when wearing the support structure; an antenna embedded into or forming part of the support structure, the antenna at least partially extending into the rim; a transceiver adapter to send and receive signals; and a tuner coupled between the transceiver and the antenna, the tuner adapted to match impedance between the antenna and the transceiver to improve power transfer.

15 Claims, 6 Drawing Sheets

(51) Int. Cl.
*H01Q 9/30* (2006.01)
*H04B 17/21* (2015.01)

(56) References Cited

U.S. PATENT DOCUMENTS

| | | | |
|---|---|---|---|
| 11,371,859 B1 | 6/2022 | Amariei et al. | |
| 11,509,343 B2 * | 11/2022 | Olgun | H01Q 1/40 |
| 11,727,724 B1 * | 8/2023 | Soares | G06V 40/175 |
| | | | 345/419 |
| 2008/0027705 A1 | 1/2008 | Koga | |
| 2011/0291896 A1 | 12/2011 | Pascolini et al. | |
| 2013/0242387 A1 * | 9/2013 | Ozawa | G02B 27/0093 |
| | | | 359/464 |
| 2014/0077925 A1 * | 3/2014 | Hamadallah | A61F 9/08 |
| | | | 351/111 |
| 2014/0268008 A1 | 9/2014 | Howell et al. | |
| 2016/0204839 A1 | 7/2016 | Liu et al. | |
| 2017/0049072 A1 | 2/2017 | Oestergaard | |
| 2017/0097753 A1 | 4/2017 | Bailey et al. | |
| 2017/0279473 A1 | 9/2017 | Hiraoka et al. | |
| 2018/0076524 A1 | 3/2018 | O'Driscoll | |
| 2018/0212314 A1 | 7/2018 | Rautio | |
| 2022/0193663 A1 | 6/2022 | Yang | |
| 2023/0098170 A1 * | 3/2023 | Oka | H01Q 9/40 |
| | | | 343/702 |

* cited by examiner

ADAPTIVE EYEWEAR ANTENNA

CROSS-REFERENCE TO RELATED APPLICATIONS

This application is a continuation of U.S. patent application Ser. No. 17/187,849 filed on Feb. 28, 2021, which is a continuation of U.S. patent application Ser. No. 16/684,796 filed on Nov. 15, 2019, now U.S. Pat. No. 10,938,432, which claims priority under 35 U.S.C. § 119(e) to U.S. Provisional Patent Application No. 62/781,309, filed on Dec. 18, 2018, the contents of all of which are incorporated fully herein by reference.

FIELD OF THE INVENTION

The present invention relates to antenna systems and, more particularly, to antenna systems for use in wearable devices such as eyewear.

BACKGROUND OF THE INVENTION

Presently, there is a convergence of consumer electronics and wearable devices such as eyewear. Additionally, consumers today demand stylish eyewear. A wide variety of styles, from aviators and cat's eyes to jam jars and computer nerd squares, are available to meet this demand. This vast diversity in styles, however, makes engineering electronics for eyewear particularly challenging.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

Figure 1:
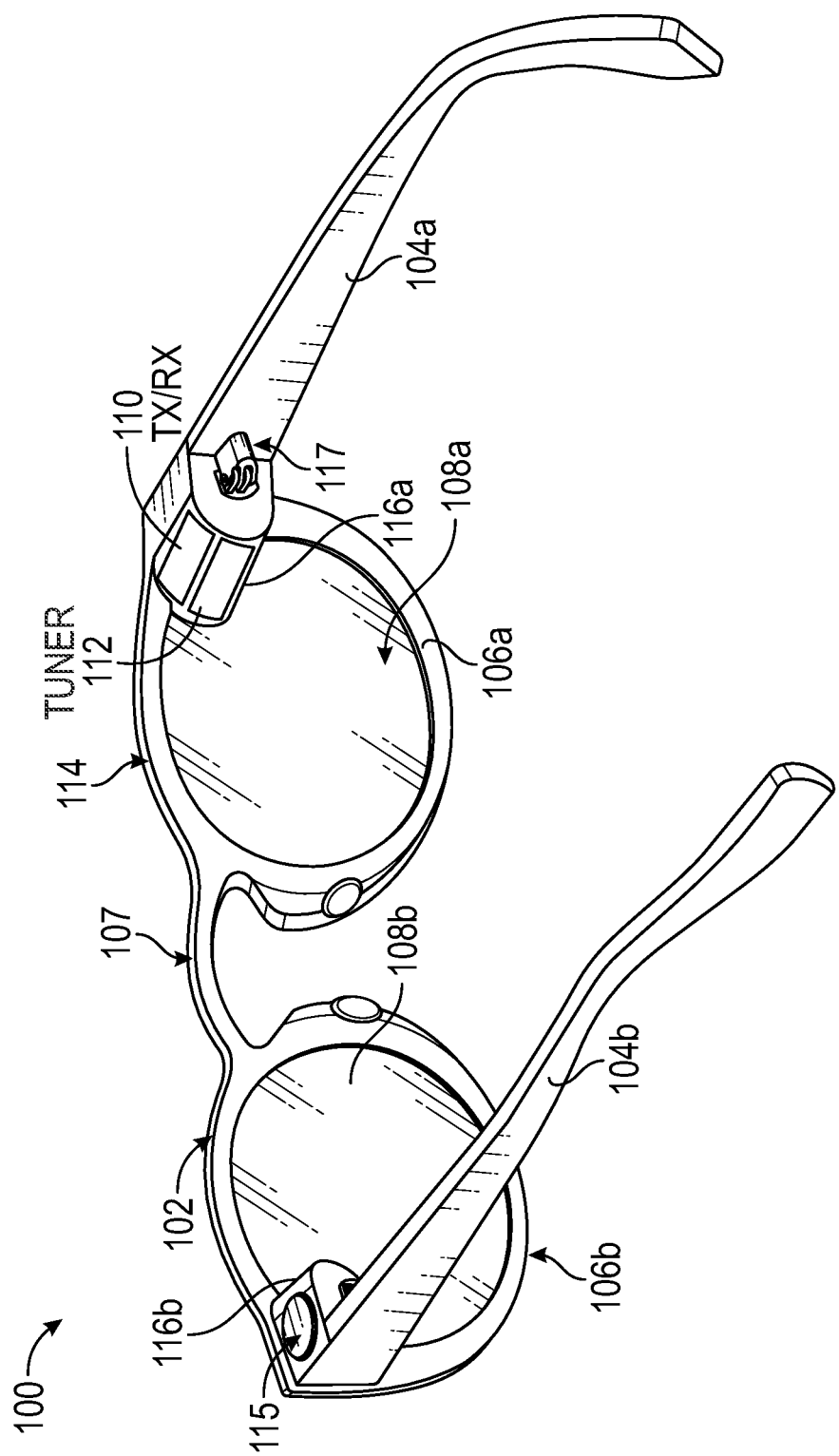
FIG. 1 is a perspective view of an eyewear device; showing physical features of the eyewear device, as well as a possible location for the eyewear device's antenna, transceiver, and tuner.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" or "connected" as used herein refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical/magnetic signals. As used herein, the term lens covers transparent or translucent pieces of glass or plastic having curved and/or flat surfaces that cause light to converge/diverge or that cause little or no convergence/divergence. The term "about" as used herein refers to a range of values surrounding an actual value, i.e., +/−10%.

The orientations of an eyewear device, associated components and any complete devices as shown in any of the drawings, are given by way of example only, for illustration and discussion purposes. In operation, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom, side, horizontal, vertical, and diagonal are used by way of example only, and are not limiting as to direction or orientation of any depth-capturing camera or component of the depth-capturing camera constructed as otherwise described herein.

It is challenging to engineer antenna systems for eyewear due to the vast diversity of styles. Antennas in today's mass market consumer electronic devices are tailor-made to a specific device and their designs are inherently a part of the industrial design. As such, engineering effort is required to design the antenna system for each eyewear style. The examples provided herein demonstrate a different approach in antenna and radio frequency (RF) front end design that addresses the engineering challenges specific to electronic eyewear devices.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

FIG. 1 depicts an eyewear device 100. Eyewear device 100 includes a support structure having a frame 102, a right temple 104a, and a left temple 104b. Frame 102 includes a right rim 106a that supports a right lens 108a and a left rim 106b that supports a left lens 108b. A bridge 107 connects the left and right rims 106a and 106b and is adapted to receive a nose of the wearer. Eyewear device 100 additionally includes a transceiver (TX/RX) 110, a tuner 112, an antenna 114, and an input device such as a selector 115. Antenna 114 is embedded within frame 102. Alternatively, antenna 114 may be embedded in right temple 104a, left temple 104b, and/or frame 102.

Eyewear device 100 additionally includes optional chunks 116a and 116b positioned between frame 102 and respective temples 104a and 104b to house electronic components. The chunks 116 may be attached to frame 102 or integrated into frame 102. Hinges such as hinge 117 may connect the temples to the chunks 116 to enable folding of the temples 104 toward frame 102 in a conventional manner. Although an eyewear device example is provided, it is to be understood that the examples described herein may be applied to other electronic devices having antennas.

Figure 2:
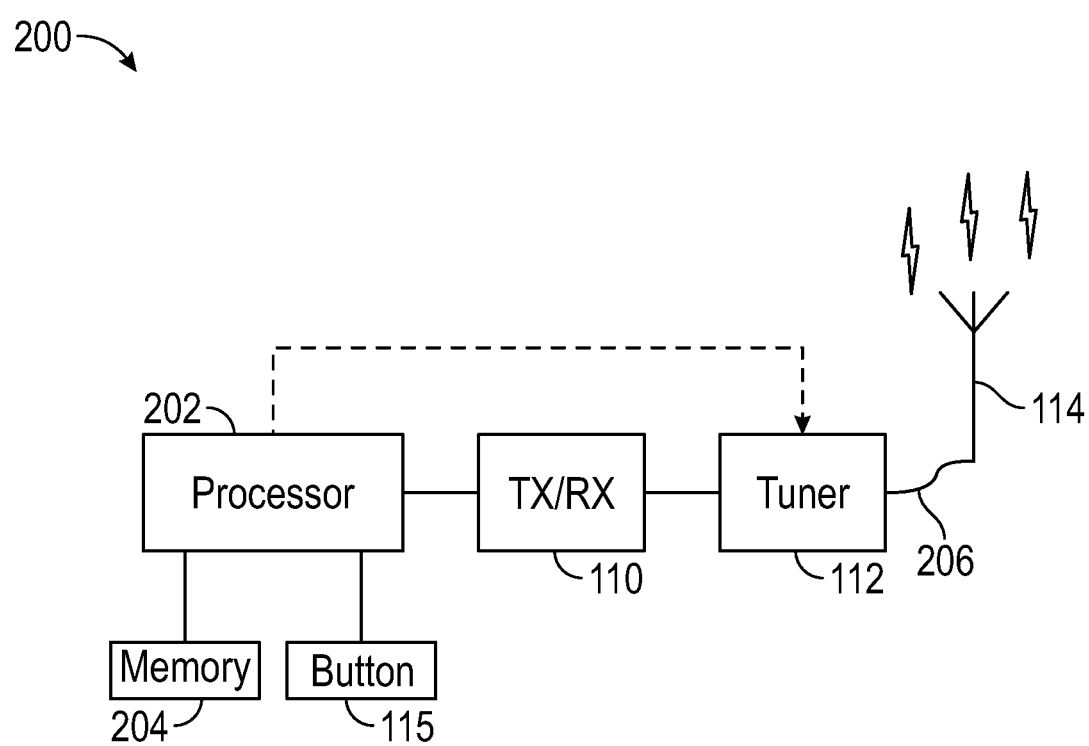
FIG. 2 is a block diagram illustrating the functional relationship between the computing components such as a processor, and the communication components including a transceiver, tuner, and antenna.

FIG. 2 conceptually depicts antenna 114 and electronic components for sending and receiving signals. The electronic components include transceiver 110 and tuner 112 coupled to antenna 114 via transmission feed line 206. The electronic components additionally include a microprocessor 202 and a memory 204.

Tuner 112 corrects for changes in antenna impedance under various use cases. Correcting the antenna impedance results in maximized power transfer between the Transceiver and the antenna 114 and maximize to the efficiency of the antenna system. The tuner 112 is configured to match impedance either by changing capacitance of the tuner 112 and/or by switching discrete lumped components in/out. Through the use of tuner 112, engineering complexity associated with incorporating an antenna into various styles of eyewear is minimized by enabling a master antenna system to be shared by various eyewear styles with an energy efficient impedance tuning system correcting impedance mismatch to maximize efficiency.

The tuner 112 can be configured initially at device production, either in a lab or a factory. However, if there is need to either cycle through pre-selected radio settings, or perform a tuning process or recalibration, a button 115 is connected to the processor 202 to allow the user the ability to signal that the tuner 112 needs to change its tuning. This button could signal a general radio tuning change, for example increasing the radio band in 5 MHz increments with each button 115 press until reaching a set maximum band, with a resulting press returning the radio band to a set minimum. The button 115 could also cycle between known radio band settings that are optimal in certain situations, such as when there is outside interference. The button 115 could also cycle between using Wi-Fi and Bluetooth bands, depending on the need of the user.

Antenna 114 is positioned within frame 102 and extends into rims 106a and 106b. Antenna 114 may be positioned within frame 102 such that it is separated from the head of a wearer to avoid losses due to human tissue, which is very lossy at RF frequencies. The separation also facilitates compliance with regulatory limits such as Specific Absorption Rate (SAR; measure of the rate of absorption of RF energy in the body). In addition, this location provides good left/right symmetric radiation patterns.

The antenna 114 may be an electric type antenna such as a monopole antenna (see FIGS. 3A to 3D and related description) or a magnetic type antenna such as a loop antenna (see FIGS. 4A to 4D and related description).

Figure 3A:
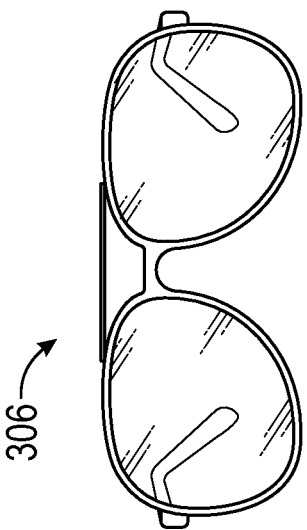
FIGS. 3A, 3B, and 3C depict three non-limiting examples of eyewear in which an electric type antenna may be incorporated.
Figure 3B:
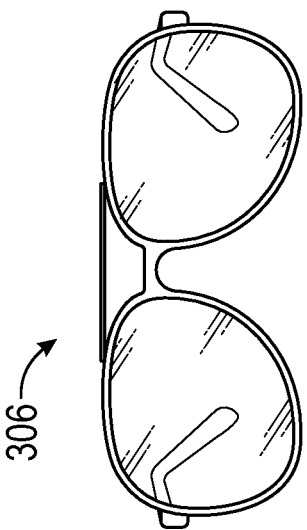
Figure 3C:
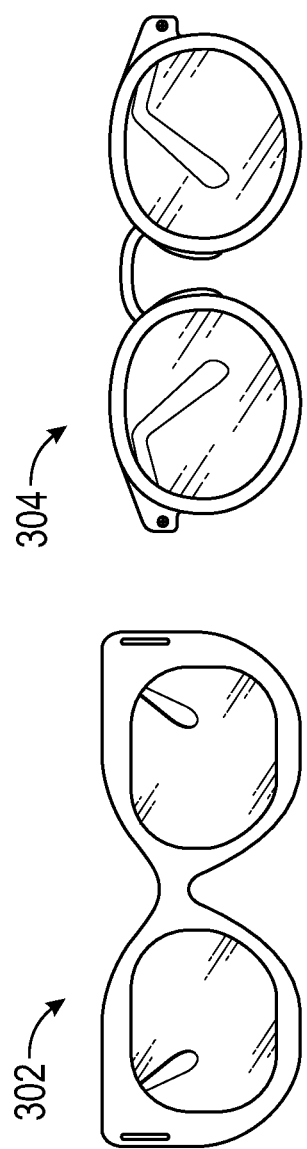

FIGS. 3A to 3C depict three non-limiting examples of eyewear 302, 304, and 306 in which an electric type antenna 114a (FIG. 3D) may be incorporated. Each of eyewear 302, 304, and 306 have a frame 102 that incorporates a non-conductive material adjacent the antenna 114a embedded within the frame. The non-conductive material may be glass, polymer, fiber, ceramic, or other type of non-conductive material.

Figure 3D:
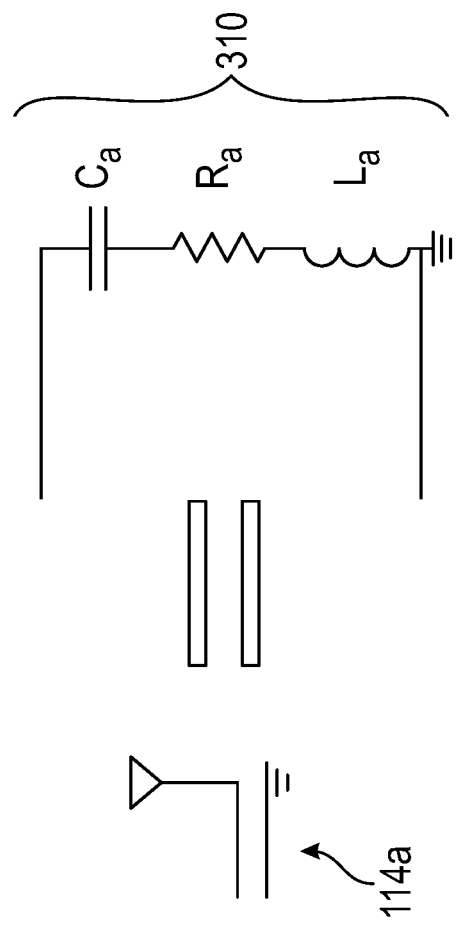
FIG. 3D is a schematic representation of an electric type antenna and its circuit equivalent.

FIG. 3D depicts a schematic representation of an electric type antenna 114a and its circuit equivalent 310. The circuit equivalent includes a capacitor, $C_a$, a resistor, Ra, and an inductor, La, connected in series. In order for the antenna to fit in a wider variety of eyewear styles, a relatively small antenna thickness may be selected (e.g., a fixed amount that is less than 0.1 mm thick). This allows the same antenna element to fit inside a very thin housing or a much thicker housing. Additionally, the antenna length is selected to fit within many diverse styles (e.g., a fixed length between 5 and 10 cm). Fixing the antenna thickness and length provides reduced engineering complexity and production cost. However, fixing the antenna length and thickness and using the same antenna across different eyewear device styles has implications on the variance of the impedance presented to the transceiver.

The length and the thickness of the antenna 114a determines the antenna's inductance, La (FIG. 3D). Assuming the antenna length is shorter than half of the operating wavelength, any increase in antenna length increases antenna inductance. In addition, a thinner antenna has increased inductance and reduced capacitance when compared to a thicker antenna. Since the quality factor, Q, of a series RLC circuit is inversely proportional to the square root of capacitance and directly proportional to the square root of the inductance, a thinner antenna will also have a higher Q and a lower impedance bandwidth.

An antenna radiates best when the inductance and capacitance shown in FIG. 3D tune each other out and as a consequence all the available energy is used for radiation. This phenomenon is called resonance. The antenna resonance frequency is inversely proportional to the square root of the antenna inductance and antenna capacitance. If the antenna length and thickness are fixed, the antenna inductance is fixed. On the other hand, the antenna capacitance, $C_a$, can vary between various eyewear designs such as shown in FIGS. 3A-3C because antenna capacitance is affected by the electrical properties of the material that surrounds it.

The resonant frequency of the antenna 114a should be the same across different eyewear device styles to maximize radiation efficiency, even though the inherent antenna capacitance is different between diverse styles and the antenna inductance is fixed. In an example, the tuner 112 is configured to adjust series capacitance between the transceiver and the antenna 114a. The tuner 112 provides the appropriate series capacitance to the antenna 114a to tune the eyewear device to a desired resonance frequency.

In one example, the tuner 112 may be an adaptive tuner. An adaptive tuner continuously monitors antenna impedance and adjusts the amount of capacitance (tuner state) as necessary to maximize impedance. The antenna impedance can be monitored by measuring return loss or by measuring received signal strength indicator (RSSI) in a time duplexed communication scheme.

Adaptive tuners perform relatively power-hungry processing, which may not be appropriate for an eyewear device with a relatively small battery capacity. Eyewear devices, however, are relative immune to the need to change antenna capacitance once an appropriate level of capacitance is determined. Thus, a fixed tuning scheme may be utilized instead of an adaptive tuning scheme.

In a fixed tuning scheme, during a factory calibration the optimum tuning capacitance value can be determined for each eyewear style incorporating a fixed length/thickness antenna during the design of that eyewear style. The optimum tuning capacitance for a style may then be written into memory 204 (e.g., read only memory; ROM) for that style during or prior to production.

For example, a factory test command can configure the transceiver 110 to transmit at a fixed RF power while the processor 202 changes the antenna tuner states and a receive system in the factory calibration test fixture can measure the power it receives. The tuner state that provides the maximum power transfer then would be deemed as the ideal tuner state.

In a frequency duplexed system, the procedure is reversed with the factory calibration test fixture transmitting at a fixed RF power while the processor of the unit changes the tune states and its transceiver measures the signal strength it receives. The tune state that results in the strongest receive signal can be deemed as the ideal tune state and written on the read only memory of the device at factory.

Figure 4A:
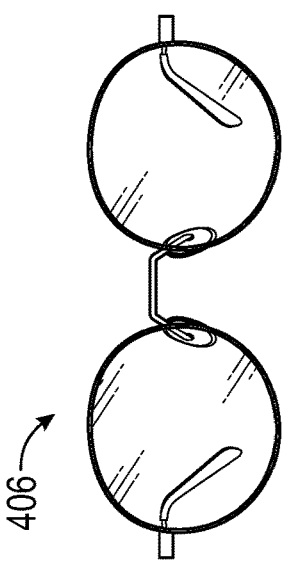
FIGS. 4A, 4B, and 4C depict three non-limiting examples of eyewear in which a magnetic type antenna may be incorporated.
Figure 4B:
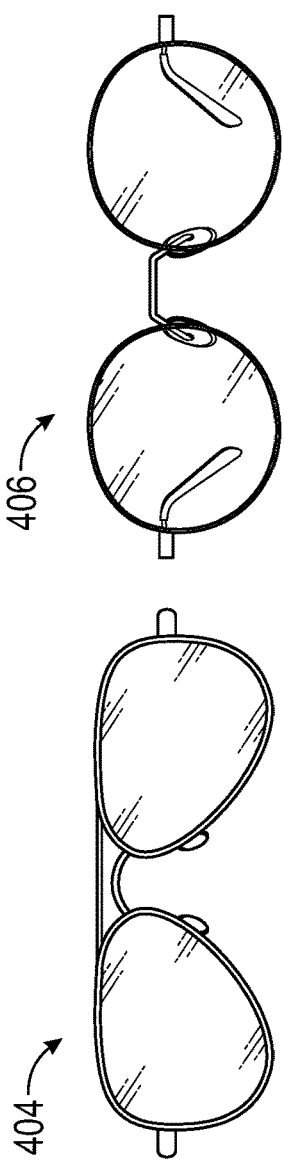
Figure 4C:
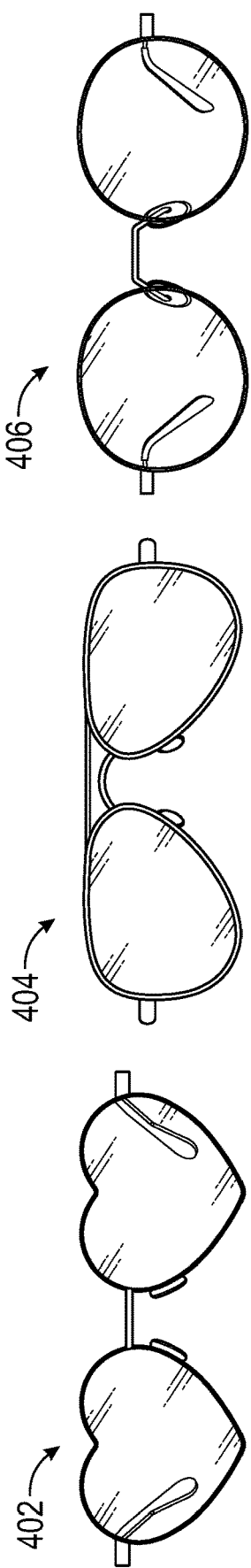

FIGS. 4A to 4C depict three non-limiting examples of eyewear 402, 404, and 406 in which a magnetic type antenna 114b (FIG. 4D) may be incorporated. Each of eyewear 402, 404, and 406 have a conductive frame 102 that forms a magnetic antenna 114b having a loop. The loop can be formed by using the conductive frame as the antenna element around a non-conductive lens.

Figure 4D:
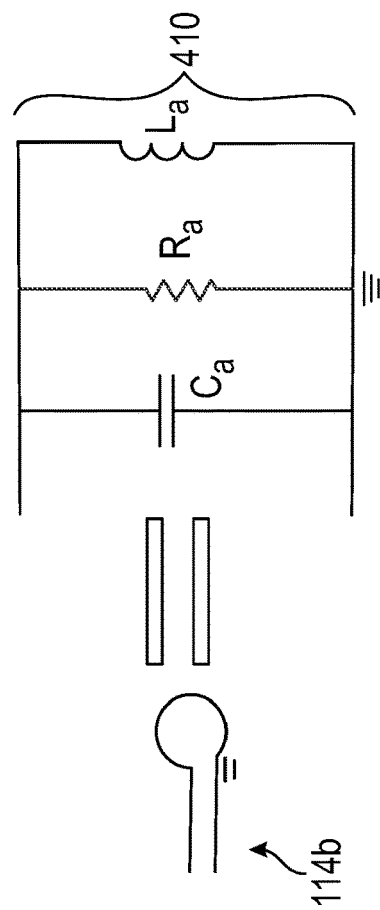
FIG. 4D is a schematic representation of an electric type antenna and its circuit equivalent.

FIG. 4D depicts a schematic representation of a magnetic type antenna 114b and its circuit equivalent 410. For the magnetic type antenna 114b, the antenna inductance is a direct result of the loop length. The longer the loop, assuming still shorter than the signal wavelength, the inductance of the antenna will increase. By fixing the antenna length and thickness, significant changes are limited to antenna inductance from one design to the other due to some styles having larger lenses than others.

The metal lens rim on example eyewear 402, 404, and 406 can be configured to use a magnetic type antenna. In order to achieve resonance, the antenna inductance and antenna capacitance are configured to tune each other out. Unlike the electric type antenna, the inductance changes between the different styles rather than capacitance. Since the magnetic type antenna 114b has an equivalent circuit of a parallel RLC, as shown in FIG. 4, a tuner 112 that adjusts capacitance tuning can be used to tune the antenna system. The tuner 112 between the antenna 114b and the transceiver 110 can provide the appropriate series capacitance to the magnetic type antenna 114b and tune the overall system to the desired resonance frequency. The tuning system here essentially corrects for the difference in loop length between different eyewear lens rim designs.

Since the same tuner mechanism can be employed for the magnetic type antenna, the same tuning logic discussed above regarding the electric type antenna section can be applied here. A factory test command can configure the RF front end to transmit at a fixed RF power while the processor scans through the antenna tuner states and a receive system in the factory calibration test fixture can measure the power it received. The tuner state that provides the maximum power transfer then would be deemed as the ideal tuner state. Since the ideal tune state is found and written to ROM of the device at factory, the tuner mechanism will have little to no impact on the battery life of the eye wearable. This way, the same transceiver and fundamental antenna design can be used across very different industrial designs, eliminating the need for tailor made antenna engineering efforts.

Figure 5:
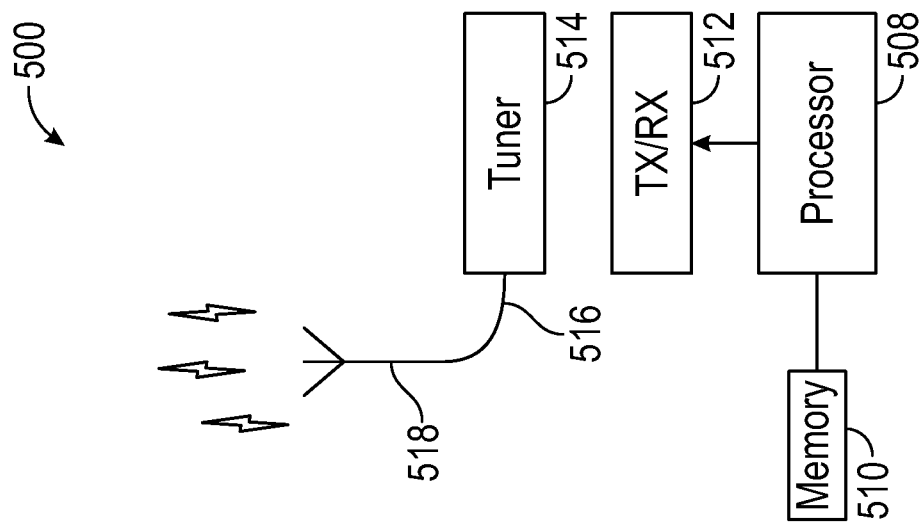
FIG. 5 is an illustration of an electric type antenna incorporated into an eyewear device and block diagrams of computing components within a simulation device used in radio tuning and an auxiliary computing device used to assist the eyewear device in radio tuning.
Figure 5:
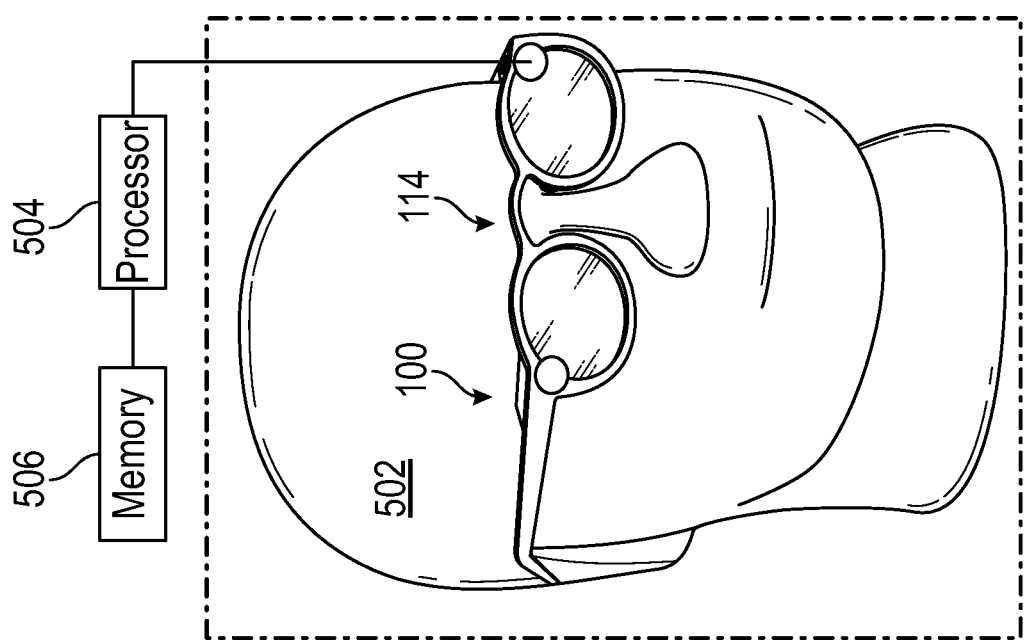

FIG. 5 is an illustration of an electric type antenna 114 incorporated into an eyewear device 100, with a simulator system 500, auxiliary memory 506, and processor 504 used to control the eyewear tuner 112 during, for example, a factory tuning process. The eyewear device 100 is substantially similar to the eyewear device 100 in FIG. 1, including having the electric type antenna 114 described in FIG. 3D. The eyewear device 100 is placed on a specific anthropomorphic mannequin (SAM) head model 502, which is a device used to detect specific absorption rates of radiation, from devices that radiate, such as a cell phone or Bluetooth device.

In one example, the eyewear device 100 is connected to an auxiliary processor 504 and memory 506 for tuning. The auxiliary processor 504 and memory 506 are configured to interact with the simulator system 500 and perform the tuning process on the eyewear device's 100 tuner 112. The auxiliary processor 504 and memory 506 could be connected to the eyewear device 100 by a wired connection, or a wireless connection, possibly using an alternative radio within the eyewear device 100. At the end of the tuning process, the connection between the auxiliary processor 504 and memory 506 is disconnected. Alternatively, the auxiliary processor 504 could be embedded in the eyewear device 100, or co-located with the eyewear device's processor 202. Likewise, the auxiliary memory 506 could be embedded in the eyewear device 100, or collocated with the eyewear device's memory 204.

The simulation device 500 comprises a processor 508, memory 510, transceiver 512, tuner 514, antenna 518, and a connection between the tuner and the radio 516. All of these components can have similar performance capabilities as their counterparts within the eyewear device 100. There is programming in this memory 510 that configures the processor 508 to communicate with the eyewear device 100 in order to allow for the eyewear device tuner 112 to be tuned. This involves sending a constant signal to the eyewear device 100 for use in optimizing the receiver functionality of the tuner 112, i.e., increasing the performance of the transceiver 110. It also involves receiving signals on an expected bandwidth and recording when the signal received was strongest. The simulation device 500 sends these recorded measurements to the eyewear device 100, to optimize transmitter functionality of the tuner 112, i.e., increasing the performance of the transceiver 110.

The simulation device 500 and the eyewear device 100 may communicate using a wired connection, either between the simulator processor 508 and the eyewear processor 202, or between the simulator processor 508 and the auxiliary processor 504. The two devices may also communicate over another wireless connection not being tuned, or they may communicate imperfectly over the connection being tuned. In some implementations, the auxiliary memory 506 and simulator memory 510 may have programming that does not require explicit communication between the two devices in order to calibrate the tuner 112. For example, the eyewear device 100 may be configured to start a tuning sequence if, e.g., within ten second of being powered on a predetermined radio signal is detected. Upon receiving this signal from the simulation device 500, the eyewear device may have thirty seconds to try all of its receiver settings in order to optimize the radio. Then, in the following thirty seconds, the tuning of the transmitter process occurs, with the simulator device 500 sending back the time and/or setting at which the optimal signal was received.

Figure 6:
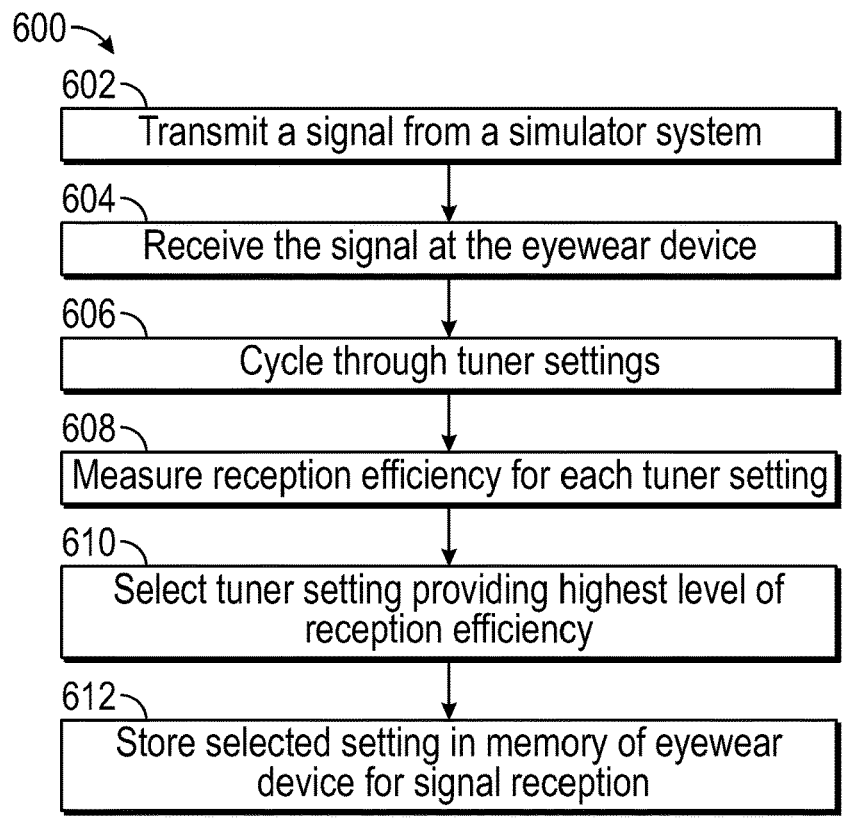
FIG. 6 is a flowchart illustrating the process of performing the initial factory antenna tuning for an electric type antenna incorporated into a wearable device.

FIG. 6 is a flowchart 600 illustrating the process of performing the initial factory setting of a fixed tuning scheme for an embedded antenna receiver. Initially, an eyewear device 100 is connected to a simulator system 500. This connection could be for example a wired connection, or a wireless connection, possibly utilizing another antenna, or perhaps even the antenna 114 being tuned itself. Using this connection, the simulator system 500 transmits a fixed radio signal from its radio 516 as operation 602. The eyewear device 100 receives this signal in operation 604 using the embedded antenna 114. Operation 606 has the eyewear device cycle through several different settings by adjusting the capacitance in the RLC circuit 114 within the tuner 112. As operation 606 occurs, the eyewear device 100 may also measure reception efficiency and rate the strength of the simulator system signal 500 at each setting as operation 608.

After sampling all of the tuner 112 settings and rating the efficiency, the eyewear device 100 in operation 610 selects the setting that provided the highest level of reception efficiency. In an example, the strongest signal is selected since the simulator system provided a constant strength signal during the entire sampling process. Finally, after having selected the most efficient tuner setting, in operation 612 the eyewear device 100 writes the tuner configuration to memory 204, so that adaptive sampling and tuning by the tuner 112 is not required for utilization of the antenna 114 for receiving, increasing the energy efficiency of the eyewear device 100.

Alternatively, or additionally, the factory tuning functionality of the eyewear device 100 is maintained in a separate, auxiliary processor 504 and memory 506. This allows the eyewear processor 202 and memory 204 to not require the functionality to perform this factory tuning, potentially freeing up space in the eyewear memory 204 and reducing the complexity of the eyewear processor 202.

Figure 7:
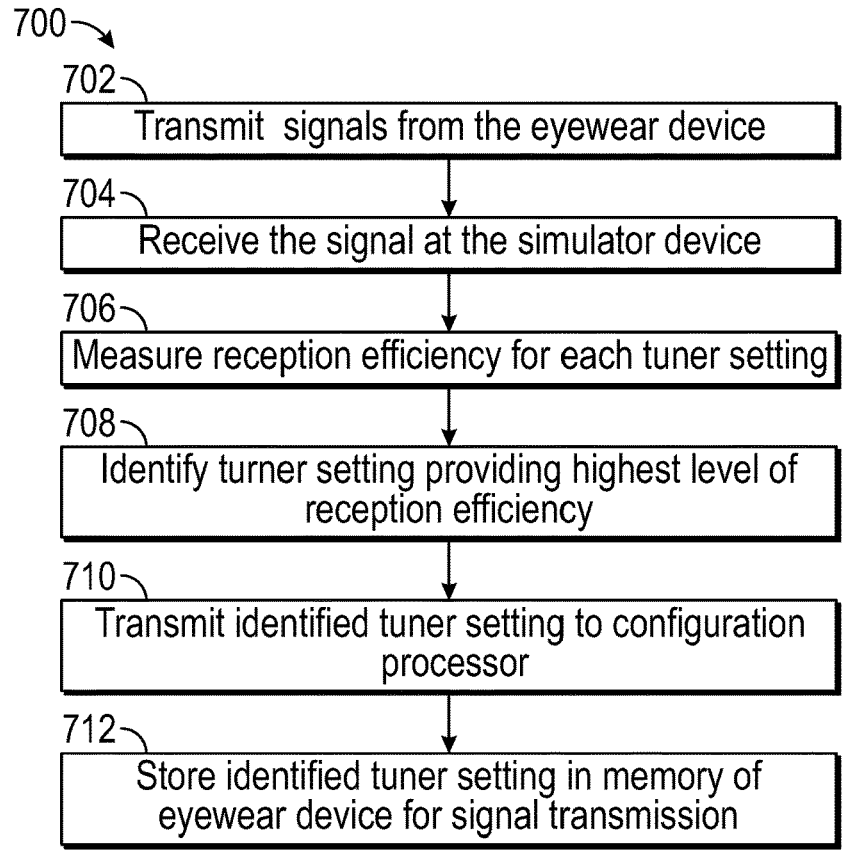
FIG. 7 is a flowchart illustrating the process of performing the initial factory antenna tuning for a magnetic type antenna incorporated into a wearable device.

FIG. 7 is a flowchart 700 illustrating the process of performing the initial factory setting of a fixed tuning scheme for an embedded antenna transmitter. Initially, an eyewear device 100 is connected to a simulator system 500. This connection could be for example a wired connection, or a wireless connection, possibly utilizing another antenna, or perhaps even the antenna 114 being tuned itself. Using this connection, the eyewear device 100 transmits a radio signal from its antenna 114 as operation 702. The simulator device 100 receives this signal in operation 704 using its own antenna. Operation 706 has the eyewear device 100 cycle through several different settings by adjusting the capacitance in the RLC circuit 114 within the tuner 112. As operation 706 occurs, the simulator device 500 measures reception efficiency and rates the strength of the simulator system 500 signal at each setting at operation 708. In this example, the eyewear device 100 is communicating which setting of tuner 112 it is using as it sends the transmitted signal. Once the test cycle completes, operation 710 has the simulation device send back the settings that generated the most efficient signal.

In another example, both devices are preprogrammed to know that the tuner settings tests occur at certain time intervals, i.e., frequency A at 0 seconds, frequency B at 1 second, frequency C at 2 seconds. In this example, the simulation device 500 sends back a value such as time that corresponds to which frequency was most efficient, and the eyewear device 100 converts this value back to the setting for tuner 112. After receiving feedback from the simulation device 500, the eyewear device 100 in operation 710 selects the setting that provided the highest level of reception efficiency. In an example, the setting providing the strongest signal is selected since the simulator system 500 listened for a specific frequency signal during the entire sampling process. Finally, after having selected the most efficient tuner setting, in operation 712 the eyewear device 100 writes the tuner configuration to memory 204, so that adaptive sampling and tuning by the tuner 112 is not required for utilization of the antenna 114 for transmitting, increasing the energy efficiency of the eyewear device 100.

Alternatively, or additionally, the factory tuning functionality of the eyewear device 100 is maintained in a separate, auxiliary processor 504 and memory 506. This allows the eyewear processor 202 and memory 204 to not require the functionality to perform this factory tuning, potentially freeing up space in the eyewear memory 204 and reducing the complexity of the eyewear processor 202.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed:

1. A method for producing eyewear devices, each eyewear device having a support structure, an antenna supported by the support structure, a memory, and a tuner, the method comprising:
   identifying a style of an eyewear device from a plurality of styles of eyewear devices being produced, and another style of another eyewear device from the plurality of styles of eyewear devices being produced, the antennas of the plurality of styles of eyewear devices being produced having the same length;
   determining a tuning value based on the identified style of the eyewear device and another tuning value based on the other identified style of the other eyewear device; and
   writing the determined tuning value to the respective memory of the eyewear device for use by the respective tuner and the determined other tuning value to the respective memory of the other eyewear device for use by the respective tuner.

2. The method of claim 1, wherein the method further comprises:
   positioning the antenna within the eyewear device; and
   positioning the antenna of the other eyewear device within the other eyewear device.

3. The method of claim 1, wherein the antenna is at least one of a monopole antenna or a loop antenna.

4. The method of claim 1, wherein the antenna length is between 5 and 10 centimeters long and the antenna thickness is less than 0.1 mm thick.

5. An eyewear device having a style, the eyewear device comprising:
   a support structure;
   an antenna supported by the support structure, wherein the antenna has an antenna thickness and an antenna length that is equal to an antenna thickness and an antenna length of another eyewear device having another style, wherein the antenna length is between 5 and 10 centimeters long;
   a memory adapted to receive and store a tuning value determined for the eyewear device based on the style of the eyewear device; and
   a tuner configured to correct for impedance mismatch between the antenna and a transceiver using the tuning value from the memory.

6. The eyewear device of claim 5, wherein the other eyewear device has another memory storing another tuning value that is different than the tuning value.

7. The eyewear device of claim 5, wherein the antenna thickness is less than 0.1 mm thick.

8. The eyewear device of claim 5, wherein the support structure is adapted to be head worn, the support structure includes a rim configured to support a lens in a viewing area visible to a user when wearing the support structure, and the antenna is embedded into or forms part of the support structure.

9. The eyewear device of claim 8, wherein the antenna at least partially extends into the rim.

10. The eyewear device of claim 8, wherein the support structure comprises one or more of glass, polymer, fiber, or ceramic adjacent to the antenna.

11. The eyewear device of claim 8, wherein the antenna is a monopole antenna.

12. The eyewear device of claim 8, wherein the antenna is a loop antenna.

13. The eyewear device of claim 12, wherein the rim of the support structure is conductive and forms at least part of the loop antenna.

14. The eyewear device of claim 5, wherein the memory is read only memory (ROM) and wherein the tuning value is stored in the ROM.

15. A non-transitory computer readable medium including instructions for execution by a processor during production of an eyewear device having a support structure, an antenna supported by the support structure, a memory, and a tuner, the instructions, when executed, configuring the processor to:
   identifying a style of an eyewear device from a plurality of styles of eyewear devices being produced, and another style of another eyewear device from the plurality of styles of eyewear devices being produced, the antennas of the plurality of styles of eyewear devices being produced having the same length;
   determining a tuning value based on the identified style of the eyewear device and another tuning value based on the other identified style of the other eyewear device; and
   write the determined tuning value to the respective memory of the eyewear device and the determined other tuning value to the respective memory of the other eyewear device for use by the respective tuner.

* * * * *